United States Patent [19]

Turner et al.

[11] Patent Number: 5,227,462

[45] Date of Patent: Jul. 13, 1993

[54] PREPARATION OF MULTIPLY-BRANCHED ALIPHATIC-AROMATIC POLYESTERS AND MULTIPLY-BRANCHED ALIPHATIC-AROMATIC POLYESTERS

[75] Inventors: S. Richard Turner, Pittsford, N.Y.; Brigitte I. Voit, Munich, Fed. Rep. of Germany

[73] Assignee: Eastman Kodak Company, Rochester, N.Y.

[21] Appl. No.: 912,359

[22] Filed: Jul. 13, 1992

[51] Int. Cl.$^5$ .................. C08G 63/00; C08G 63/06; C08G 63/66

[52] U.S. Cl. ............................... 528/361; 528/125; 528/167; 528/173; 528/205; 528/206; 528/208; 528/327

[58] Field of Search ............ 528/361, 125, 167, 173, 528/205, 206, 208, 327

[56] References Cited

U.S. PATENT DOCUMENTS

| | | |
|---|---|---|
| 615,398 | 0/0000 | Frechet et al. |
| 788,070 | 0/0000 | Turner et al. |
| 3,699,939 | 6/1972 | Baker et al. |
| 4,857,630 | 8/1989 | Kim |
| 5,041,516 | 8/1991 | Frechet et al. |
| 5,136,014 | 8/1992 | Figuly ........................ 528/272 |

OTHER PUBLICATIONS

Tomalia, D. A., et al., Angewandte Chemie, International Edition in English, 29, 138-175 (1990).
Newkome et al., Journal of the American Chemical Society, vol. 112, 8458 (1990).
Uhrich, K. E., et al., Polymer Materials Science and Engineering, vol. 64, pp. 137-138.
Flory, P. J., Journal of the American Chemical Society, 74, p. 2718 (1952).
Kim, Y. H. et al., Journal of the American Chemical Society, vol. 112, p. 4592 (1990).
Hawker, C. J., Lee, R. and Fretchet, M. J. M., Journal of the American Chemical Society, vol. 113, No. 12 (1991), pp. 4583-4588.

*Primary Examiner*—John Kight, III
*Assistant Examiner*—T. Mosley
*Attorney, Agent, or Firm*—Robert L. Walker

[57] ABSTRACT

A multiply-branched aliphatic-aromatic polyester and a method for producing that polymer. The method comprises condensing a branching reactant represented by the general formula

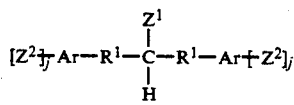

Each j is 1 or 2, each Ar is independently selected from the group consisting of aromatic and heteroaromatic moieties having a total of ring carbons and heteroatoms of from 5 to about 20, each $R^1$ is a linking group independently selected from alkyl having from 1 to about 6 carbons, fluoroalkyl having from 1 to about 6 carbons, —O—, —S—, —C≡C—, and

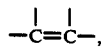

$Z^1$ is selected from the group consisting of hydroxyl and —OSi(CH$_3$)$_3$, and each $Z^2$ is independently selected from groups having the structural formula

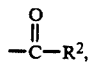

wherein each $R^2$ is independently selected from the group consisting of hydroxy, chloro, bromo, monovalent alkoxide having from 1 to about 6 carbons, and —O—(CH$_2$)$_g$—OH, wherein g is an integer from 1 to 3, or $Z^1$ has the structural formula

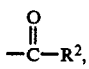

wherein each $R^2$ is independently selected from the group consisting of hydroxy, chloro, bromo, monovalent alkoxide having from 1 to about 6 carbons, and —O—(CH$_2$)$_g$—OH, wherein g is an integer from 1 to 3, and each $Z^2$ is hydroxyl.

12 Claims, No Drawings

PREPARATION OF MULTIPLY-BRANCHED ALIPHATIC-AROMATIC POLYESTERS AND MULTIPLY-BRANCHED ALIPHATIC-AROMATIC POLYESTERS

BACKGROUND OF THE INVENTION

The present invention pertains to processes for the preparation of highly branched polymers and aliphatic-aromatic polyesters. More particularly, the present invention pertains to multiply-branched polyesters and processes for the preparation of multiply-branched aliphatic-aromatic polyesters.

Highly branched, non-crosslinked polymers have been prepared by "multiple generation" and "single generation" procedures. The multiple generation procedures are exemplified by Tomalia, D. A., et al, Angewandte Chemie, International Edition in English, 29, 138–175 (1990) and U.S. Pat. No. 5,041,516 to Frechet, J. M. J. et al, which describe the preparation of highly branched, non-crosslinked polyamidoamines and polybenzyl ethers, respectively. Tomalia et al identified the polymers produced as "starburst polymers" or "starburst dendrimers". Both publications describe preparations in which the macromolecules were prepared by repeatedly reacting, isolating and purifying a product through a series of growth steps. The product of each growth step is called a "generation". These procedures are highly laborious, but the product produced is highly uniform. Newkome et al, Journal of the American Chemical Society, Vol. 112, 8458, (1990) describes a similar step and repeat process used to build up various macromolecules described as tree-like and identified as "arborols".

Single generation procedures are much less laborious than multiple generation procedures. The single generation procedures are exemplified by Flory, P. J., Journal of the American Chemical Society, 74, p.2718 (1952), which presents a theoretical analysis of the formation of highly branched, soluble polymers from monomers having the structure $AB_x$, in which A and B are the reactive groups, by step-growth polymerization, with random branching and without cross-linking. Kim, Y. H. et al, Journal of the American Chemical Society, Vol. 112, p. 4592 (1990) and U.S. Pat. No. 4,857,630 to Y. H. Kim, describe this kind of "single generation" approach in the preparation of hyperbranched polyphenylenes. U.S. Pat. No. 3,669,939 to Baker, A. S. et al teaches highly branched, non-crosslinked, aliphatic polyesters, prepared by a "single generation" melt condensation polymerization of monomers having a single carboxylic acid functionality and multiple alcohol functionalities. Hawker, C. J., Lee, R. and Frechet, M. J. M., Journal of the American Chemical Society, Vol. 113, No. 12, (1991) pp 4583–4588, teaches a single generation procedure for the preparation of all aromatic, highly-branched, non-cross-linked polyesters. In this procedure, 3,5-bis(trimethylsiloxy)benzoyl chloride is melt polymerized by the Kricheldorf method, described in H. R. Kricheldorf et al, Makromol. Chem. 184, 475 (1983), driving off trimethylsilylchloride. The product can be subjected to hydrolysis to provide phenolic terminated highly branched polyesters. This procedure has the shortcomings of requiring expensive, water-sensitive reactants and difficult monomer preparation steps. U.S. patent application Ser. No. 788,070, filed Nov. 11, 1991, by S. Richard Turner et al, teaches the preparation of multiply-branched polyesters by reacting compounds having the general structure HOOC—Ar—(O—CO—alkyl) (2 or 3) or having the general structure alkyl-CO—O—Ar—(COOH) (2 or 3). The above-discussed all-aliphatic branched polyesters of Baker et al and all-aromatic polymers of Hawker and Frechet et al and Turner et al have extremely divergent Tg's. The all-aliphatic polymers have very low Tg's, which limits use temperatures. The all-aromatic polymers have very high Tg's, which makes melt condensation and various polymer processing procedures difficult.

SUMMARY OF THE INVENTION

The invention provides for highly-branched structures of high molecular weight having useful terminal groups and moderate Tg's in a useful range for melt condensation and polymer processing and has the advantages of not requiring multiple generations of reactions and purifications or the use of trimethylsilyl benzoic acid chlorides. The invention, in its broader aspects, provides an improved method for producing a multiply-branched polymer comprising condensing a branching reactant represented by the general formula

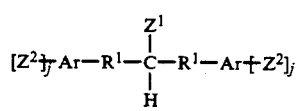

Each j is 1 or 2, each Ar is independently selected from the group consisting of aromatic and heteroaromatic moieties having a total of ring carbons and heteroatoms of from 5 to about 20, each $R^1$ is a linking group independently selected from alkyl having from 1 to about 6 carbons, fluoroalkyl having from 1 to about 6 carbons, —O—, —S—, —C≡C—, and

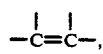

$Z^1$ is selected from the group consisting of hydroxyl and —OSi(CH$_3$)$_3$, and each $Z^2$ is independently selected from groups having the structural formula

wherein each $R^2$ is independently selected from the group consisting of hydroxy, chloro, bromo, monovalent alkoxide having from 1 to about 6 carbons, and —O—(CH$_2$)$_g$—OH, wherein g is an integer from 1 to 3, or $Z^1$ has the structural formula

wherein each $R^2$ is independently selected from the group consisting of hydroxy, chloro, bromo, monovalent alkoxide having from 1 to about 6 carbons, and —O—(CH$_2$)$_g$—OH, wherein g is an integer from 1 to 3, and each $Z^2$ is hydroxyl.

DESCRIPTION OF A SPECIFIC EMBODIMENT

The method of producing multiply-branched aliphatic-aromatic polyesters of the invention utilizes a condensation of a "branching reactant", which can be a single compound or mixture of two or more compounds. Each of the compounds in branching reactant has the general structure

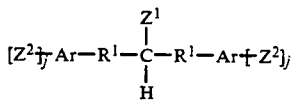

$Z^1$ and $Z^2$ are groups which will react together to form an ester linkage. One of $Z^1$ and $Z^2$ has the general structure

in which each $R^2$ is independently selected from the group consisting of hydroxy, chloro, bromo, monovalent alkoxide having from 1 to about 6 carbons, and $-O-(CH_2)_d-OH$, wherein d is an integer from 1 to 3. The other one of $Z^1$ and $Z^2$ is selected from $-OH$ and $-OSi(CH_3)_3$.

Each j is independently 1 or 2.

Each $R^1$ is a linking group independently selected from alkyl having from 1 to about 6 carbons, fluoroalkyl having 1 to about 6 carbons, $-O-$, $-S-$, $-C\equiv C-$, and

Each Ar is independently selected and is an aryl or heteroaryl group having from 1 to 3, five or six membered rings. The rings are solitary or linked or fused. Ar can have other additional substituents, so long as those substituents do not have a deleterious effect, for example, condensation with $Z^1$ or $Z^2$ groups or steric hindrance or electronic deactivation of the condensation polymerization. For example, additional substituents cannot be hydroxyls, esters, aminos or sulfonic acids, since those groups would condense with $-CO-R^2$. Acceptable substituents include: chloro; fluoro; cycloalkyl; and alkyl, alkoxy, and haloalkyl, all having from 1 to 4 carbons. The $-Z^2$ group or groups on a ring can be can be ortho or meta or para to each other and other ring substituents. Linked rings can be joined by a linking group selected from the group consisting of $-O-$, $-S-$,

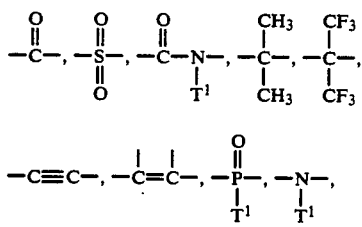

and $-(CF_2)_d-$.

Each $T^1$ is independently selected from the group consisting of alkyl and aryl, and d is an integer from 1 to 6. Suitable $-Ar-$ groups include phenyl, thiophene, furan, napthyl, anthracyl, phenanthryl, biphenyl, phen-ylether, diphenylsulfone, diphenylketone, diphenylsulfide, pyridine, quinoline, and

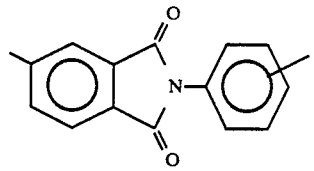

Repeating units of the multiply-branched polyesters of the invention can be represented by the five structural formulas, (i)-(v):

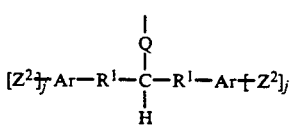 (i)

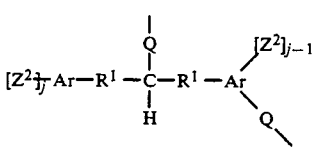 (ii)

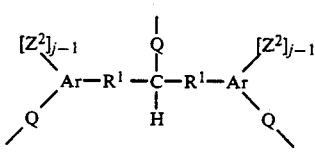 (iii)

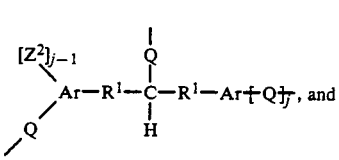 (IV)

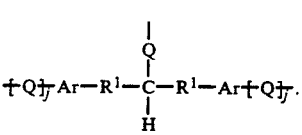 (v)

In these formulas, j=1 or 2, Ar and $R^1$ have the same meaning as above and Q is an ester linkage. If j is replaced by 2 in formulas (i)-(v), each formula represents a different subunit. If j is replaced by 1 in formulas (i)-(v), formulas (iii), (IV), and (v) are redundant, as each represent the same subunit. If one j in formulas (i)-(v) is replaced by 1 and the other j is replaced by 2, then formula (IV) is redundant and formula (ii) represents two different subunits:

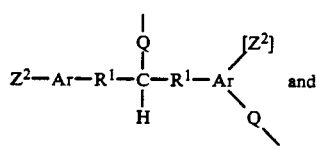 and

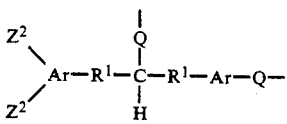

As the above repeating unit formulas indicate, condensation of —$Z^2$ groups of non-terminal repeating units is not complete and many —$Z^2$ groups are non-branched and remain unreacted after the condensation of the method of the invention. Termini or terminal repeating units have the general formula

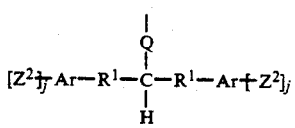

A single subunit in each macromolecule of the multiply-branched polyesters of the invention can bear a —$Z^1$ group in place of an ester linkage.

For convenience, the branching reactant is generally discussed herein as an individual compound. Using an individual compound in the method of the invention produces a multiply-branched polymer which is analogous to a homopolymer, that is, although the repeating units in a macromolecule have the above-noted differences, each of those repeating units is derived from the same compound. The method of the invention is not limited to such "homopolymers". Mixtures of two or more compounds can be used as the branching reactant, to produce a multiply-branched polymer analogous to a copolymer. Relative percentages of the different compounds used can be varied. The compounds can differ, for example, in —$Z^1$ and —$Z^2$ groups, in aromatic residues, in placement of —$Z^2$ groups on aromatic residues, in —$R^1$ groups, in $R^2$ groups, in values of j, or in a combination of features.

In a particular embodiment of the invention, the method of invention is limited to what can be referred to as a "self-condensation" of the branching reactant. The term "self-condensation" describes the condensation of subunits of the branching reactant with each other. Those subunits can be contributed by one compound or a mixture of compounds. In an alternative embodiment of the invention, the branching reactant is self-condensed and co-condensed with a non-branching reactant, which has the general structure $Z^1$—Ar—(—$Z^2$)e, in which e is 0 or 1. If e is 0, the non-branching reactant provides "end-capping" repeating units which terminate branches of the multiply-branched polymer. If e is 1, the non-branching reactant provides additional linear repeating units in the multiply-branched polymer. The end-capped termini and additional linear repeating units are, in effect, defects in that branching is reduced. Defects are desirably kept to a small percentage of repeating units. The polymers of the invention do not include a percentage of non-branching repeating units great enough to destroy multiple branching in the polymer and produce a polymer in which branches do not themselves also branch.

It is necessary that a selected reactant polymerize under the reaction conditions employed. It is desirable that the reactants be sufficiently stable under the reaction conditions employed and that the reactants be free of groups which unduly retard the reaction by steric hindrance or other means. It is also desirable that the reactants not be subject to an unacceptable amount of undesirable side reactions, to prevent the formation of an unacceptable amount of by-product, for example, an unacceptable amount of linear repeating units.

The accessible terminal groups of the multiply-branched aliphatic-aromatic polyesters can be reacted to modify the accessible terminal groups or attach other molecules to the termini or to cross-link the termini either within a polymer molecule or between polymer molecules. Suitable reactions are those of equivalent terminal groups of linear polyesters, such as: ester formation, amide formation, and urethane formation. Functional groups that can be thus provided as termini of the multiply-branched aliphatic-aromatic polyesters include: phenol; carboxylic acid; carboxylic acid chloride, perfluorinated aryl or alkyl; primary, secondary and tertiary amine groups; aryl halides such as —Cl, —Br, and —I; and benzyl chloride groups. Polymers can be joined to termini to provide star copolymers in which polymer arms are grafted to termini of the multiply-branched aliphatic-aromatic polyester core. Particularly convenient polymers for grafting are those having —OH, —$NH_2$, —COOH, —Cl, —Br, and —I end groups, which can be joined to terminal acetoxy, phenol or carboxyl groups by reactions well known to those skilled in the art.

The method of the invention can be conducted in the presence of a catalyst to enhance the rate of reaction. Catalysts useful in the method of the invention include condensation catalysts useful in the production of linear polyesters; for example: Mg, MgO, titanium compounds such as titanium(IV)butoxide and $TiO_2$ and tin compounds having the general structure $Sn(R)_4$, such as dibutyl tin diacetate. A catalytic amount of catalyst is employed. By "catalytic amount" is meant an amount of catalyst which catalyzes the reaction to the desired extent. Generally, the amount of catalyst is at least about 0.005 mole percent based on the molar amount of reactant. There is no real upper or lower limit on the amount of catalyst, this being defined by secondary considerations such as cost and ease of separation of the catalyst from products and unreacted reactants. A preferred catalytic amount is from about 0.01 to about 1.0 mole percent based upon the molar amount of reactant. The catalyst can be bound to a support or unsupported.

The polymerization reaction is preferably carried out in the absence of solvent by merely heating the reactant. The polymerization reaction can be conducted in the presence of solvent, which appreciably dissolves reactants to provide a liquid reaction medium. The use of solvent slows the rate of reaction, in comparison to a melt polymerization. If solvent is used, it is desirable that the solvent be "inert" to the reaction, i.e., that the solvent not enter into the reaction in an undesired way. It is desirable that the solvent have a high boiling temperature so that elevated temperatures can be used in the reaction. The invention is not limited to a particular solvent or solvent system and a wide variety of solvents can be used. Examples of solvents are dimethylformamide and tetramethylenesulfone. The amount of solvent present is not critical, however, practical limits are imposed by the reduced reaction rate, the ease of separation of product from the reaction medium, cost and other factors. The reaction can also be carried out in the presence of a high boiling non-solvent or diluent such as biphenyl or Marlotherm-S. The purpose of this medium is to aid in heat transfer and processability of the polymerization monomer.

During the polymerization reaction the small molecule elimination product of the —$R^2$ group is produced and evolves from the reaction melt or solution or mixture. For example, if —$R^2$ is —O—$CH_3$, then methanol is produced. Removal of the H—$R^2$ provides a driving force for completion of the polymerization reaction. The H—$R^2$ can be removed by passing a stream of an inert gas such as nitrogen or argon over or through the reaction mass at atmospheric or superatmospheric pressure or alternatively by applying a vacuum to the reaction apparatus or by reacting H—$R^2$ to produce a precipitate or the like. For example, if $R^2$ is Cl, the H—$R^2$ can be removed by reacting the H—$R^2$ with a macromolecular base such as polyvinylpyridine. The H—$R^2$ may be collected for some other use. As a skilled practitioner will recognize, the specific means used to drive the polymerization reaction is not critical.

A suitable reaction temperature for the method of the invention, affords a reasonable rate of reaction and does not give an undue amount of decomposition of products or reactants or solvent. The polymerization reaction is generally conducted at a temperature above about 130° C. Although the reaction can be conducted at temperatures below 130° C., the polymerization reaction is much slower and molecular weight of product may be reduced. Non-reactive diluents can be used to conduct the polymerization at a reasonable rate at a lower temperature. The upper temperature limit on the polymerization reaction is determined by decomposition temperatures. A suitable temperature range is 140°–280° C. The process of this invention is preferably conducted at a temperature within the range of from about 140° C. to about 250° C.

The reaction time is not a truly independent variable but is dependent at least to some extent on the other reaction parameters selected such as the reactivity of reactant, absence or presence of catalyst, reaction temperature, physical properties of the desired product and so forth. Generally, reaction times within the range of from about 0.5 to about 60 hours are used.

Agitation of the reaction mixture or solution is optional, however agitation assists in the production and yield of the polymer. Agitation of the reaction mixture can be accomplished by any known method, such as mechanical stirring.

The polymerization reaction has been carried out in a batch reaction vessel. It is proposed that the polymerization reaction could be carried out as a continuous or semi-continuous process. It is further proposed that it might be preferred that the polymerization reaction would be conducted on a continuous basis as a melt in a continuous staged reactor. In that continuous process, an inert gas, such as nitrogen or argon could be passed though the melt, preferably in a countercurrent direction, thereby accomplishing agitation and mixing of the reaction melt and at the same time removing the small molecule evolved. Alternatively, in that continuous process, a vacuum could be applied to the reactor to remove the alcohol as it is generated.

The multiply-branched aliphatic-aromatic polyesters of the invention can be used as coatings, additives, carriers and the like. Specific uses depend upon the nature of the terminal groups, which can be readily modified by a wide variety of reactions well known to those skilled in the art. For example, polymers of the invention having hydroxyl terminal groups are soluble in various organic solvents and can be used as high solids industrial coatings. Other polymers of the invention have COOH terminal groups, which can be converted to COO−(-Metal)+ groups to provide ionomers that are soluble in aqueous media and can be used for coatings and additives.

The following examples are presented for a further understanding of the invention:

EXAMPLE 1

1,5-Bis(4-carboxyphenyl)-3-pentanol was prepared by the method in U.S. Pat. No. 5,025,086, issued Jun. 18, 1991 to Blount, Jr. et al., column 10 lines 25 to 68 and column 13, lines 1 to 35. 1,5-Bis(4-carboxyphenyl)-3-pentanol (10 grams) was placed into a condensation polymerization flask under argon. The flask was evacuated, flushed with argon twice to remove air and placed in an oil bath at 235° C. After the monomer melted, three drops (approximately 0.15 milliliters) of tin dibutyldiacetate was added as catalyst. The melt was maintained at 235° C. under a slow nitrogen stream for 3 hours. Vacuum was then applied ($2 \times 10^{-2}$ torr)(metric) for 1 hour to remove water which was formed. The vacuum was then raised to $7 \times 10^{-4}$ torr (metric) and maintained for an additional 2 hours. On cooling, a glassy polymer was obtained at a quantitative yield. Tg was determined to be 105° C. In order to protect the polymer product during molecular weight determination, the polymer was reacted with N-(tert-butyldimethylsilyl)-N-methyltrifluoroacetamide (MTBSTFA) to convert carboxyl groups to dimethyl-t-butylsilylester groups. Molecular weight data were obtained with a size exclusion chromatography (SEC) system using coupled low angle laser light scattering, differential viscometry and refractive index detection and having three 7.5 mmm. i.d.×300 mm. 10 micrometer particle diameter PLgel mixed-bed columns marketed by Polymer Laboratories of Amherst, Mass. coupled in series calibrated against universal calibration standards in tetrahydrofuran. The weight average molecular weight, $M_w$, after conversion of carboxyl groups with MTBSTFA, was determined to be 11,000. Proton nuclear magnetic resonance (NMR) was performed on a 300 MHz GE instrument using deuterated dimethylsulfoxide (DMSO-$d_6$) gave the following peaks (in parts per million (ppm)): 1.9 (b,4H), 2.6 (b,4H), 5.0 (b,1H), 7.25 (b,4H), 7.92 (b,4H), 12.75 (b,1H,COOH).

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for a multiply-branched polymer comprising the step of condensing a branching reactant represented by the general formula

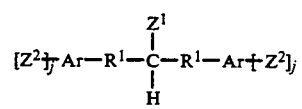

wherein
each j is 1 or 2, each Ar is independently selected from the group consisting of aromatic and heteroaromatic moieties having a total of ring carbons and heteroatoms of from 5 to about 20, each $R^1$ is a linking group independently selected from the group consisting of alkyl having from 1 to about 6 carbons, fluoroalkyl having from 1 to about 6 carbons, —O—, —S—, —C≡C—, and $$-\overset{|}{\underset{|}{C}}=\overset{|}{\underset{|}{C}}-,$$

$Z^1$ is hydroxyl or —OSi(CH$_3$)$_3$, and each $Z^2$ is independently selected from groups having the structural formula $$-\overset{O}{\overset{\|}{C}}-R^2,$$

wherein each $R^2$ is independently selected from the group consisting of hydroxy, chloro, bromo, monovalent alkoxide having from 1 to about 6 carbons, and —O—(CH$_2$)$_g$—OH, wherein g is an integer from 1 to 3, or $Z^1$ has the structural formula $$-\overset{O}{\overset{\|}{C}}-R^2,$$

wherein each $R^2$ is independently selected from the group consisting of hydroxy, chloro, bromo, monovalent alkoxide having from 1 to about 6 carbons, and —O—(CH$_2$)$_g$—OH, wherein g is an integer from 1 to 3, and each $Z^2$ is hydroxyl.

2. The method of claim 1 wherein Ar has from 2 to 3 rings, said rings each having 5 or 6 members, two of said rings being joined by a linking group selected from the group consisting of —O—, —S—, —(CF$_2$)$_z$—, $$-\overset{O}{\overset{\|}{C}}-,\ -\overset{O}{\underset{\underset{O}{\|}}{\overset{\|}{S}}}-,\ -\overset{O}{\overset{\|}{\underset{T^1}{C}}}-N-,\ -\overset{CH_3}{\underset{CH_3}{\overset{|}{C}}}-,\ -\overset{CF_3}{\underset{CF_3}{\overset{|}{C}}}-,$$

$$-C\equiv C-,\ -\overset{|}{\underset{|}{C}}=\overset{|}{\underset{|}{C}}-,\ -\overset{O}{\overset{\|}{\underset{T^1}{P}}}-,\text{ and }-\underset{T^1}{N}-,$$

wherein each $T^1$ is independently selected from the group consisting of alkyl and aryl, and z is an integer from 1 to about 6.

3. The method of claim 1 wherein Ar is a divalent or trivalent moiety selected from the group consisting of phenyl, thiophene, furan, naphthalene, anthracene, phenanthrene, biphenyl, phenylether, diphenylsulfone, diphenylketone, diphenylsulfide, (structure: phthalimide-phenyl moiety)

pyridine, quinoline, and

4. The method of claim 1 wherein said condensation is an equilibrium reaction and further comprising driving the equilibrium of said condensation toward said multiply-branched polyesters.

5. The method of claim 1 further comprising removing small molecule by-product produced during said condensation.

6. A method for producing a multiply-branched polymer comprising the step of condensing $Z^1$ and $Z^2$ groups of a reactant having the general formula $$[Z^2\!\!\!-\!\!]_j\!\!-\!\!Ar\!\!-\!\!R^1\!\!-\!\!\overset{Z^1}{\underset{H}{\overset{|}{C}}}\!\!-\!\!R^1\!\!-\!\!Ar\!\!-\!\![Z^2]_j$$

wherein j is 1 or 2, each Ar is an aryl or heteroaryl group including from 1 to 3, solitary or linked or fused, five or six membered rings, each $R^1$ is a linking group independently selected from the group consisting of alkyl having from 1 to about 6 carbons, fluoroalkyl having from 1 to about 6 carbons, —O—, —S—, —C≡C—, and $$-\overset{|}{\underset{|}{C}}=\overset{|}{\underset{|}{C}}-,$$

and one of $Z^1$ and $Z^2$ is hydroxyl, and the other one is independently selected from groups having the structural formula $$-\overset{O}{\overset{\|}{C}}-R^2,$$

wherein each $R^2$ is independently selected from the group consisting of hydroxy, chloro, bromo, monovalent alkoxide having from 1 to about 6 carbons, —O—(CH$_2$)$_g$—OH, wherein g is an integer from 1 to 3.

7. A method for producing a multiply-branched polymer comprising the step of condensing a branching reactant having the general formula $$R^2\!-\!\overset{O}{\overset{\|}{C}}\!-\!Ar\!-\!(CH_2)_d\!-\!\overset{OH}{\underset{}{\overset{|}{C}H}}\!-\!(CH_2)_e\!-\!Ar\!-\!\overset{O}{\overset{\|}{C}}\!-\!R^2$$

wherein d and e are each integers from 1 to about 11 and d+e is from 2 to about 12, each Ar is independently selected from the group consisting of aromatic and heteroaromatic moieties having a total of ring carbons and heteroatoms of from 5 to about 20, and each $R^2$ is independently selected from the group consisting of hydroxy, chloro, bromo, monovalent alkoxide having from 1 to about 6 carbons, and —O—$(CH_2)_g$—OH, wherein g is an integer from 1 to 3.

8. The method of claim 7 wherein said condensation is incomplete as to non-terminal repeating units of said multiply-branched polyester.

9. The method of claim 7 wherein individual monomer units of said reactant are condensed as to zero, or one, or more than one

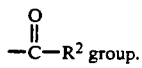
group.

10. The method of claim 7 wherein said reaction is conducted in the presence of a catalyst for a condensation reaction having as a product linear polyester.

11. The method of claim 7 wherein said reaction is conducted at a temperature between about 140° C. and about 250° C.

12. A multiply branched aliphatic-aromatic polyester having repeating units represented by the general formulas:

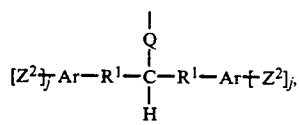

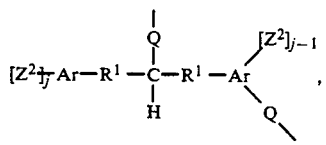

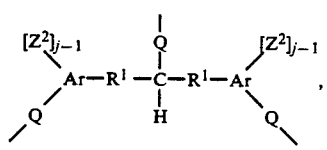

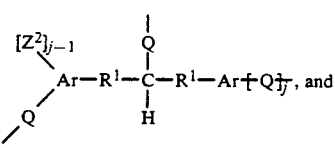

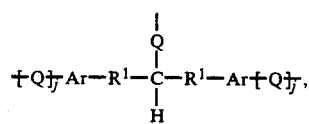

wherein
Q is an ester linkage,
each j is 1 or 2,
each Ar is independently selected from the group consisting of aromatic and heteroaromatic moieties having a total of ring carbons and heteroatoms of from 5 to about 20,
each $R^1$ is a linking group independently selected from the group consisting of alkyl having from 1 to about 6 carbons, fluoroalkyl having from 1 to about 6 carbons, —O—, —S—, —C≡C—, and

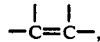

and
$Z^1$ is selected from the group consisting of hydroxyl and —OSi$(CH_3)_3$, and
each $Z^2$ is independently selected from the group of moieties having the structural formula

wherein each $R^2$ is independently selected from the group consisting of hydroxy, chloro, bromo, monovalent alkoxide having from 1 to about 6 carbons, and —O—$(CH_2)_g$—OH, wherein g is an integer from 1 to 3, or
$Z^1$ has the structural formula

wherein each $R^2$ is independently selected from the group consisting of hydroxy, chloro, bromo, monovalent alkoxide having from 1 to about 6 carbons, and —O—$(CH_2)_g$—OH, wherein g is an integer from 1 to 3, and each $Z^2$ is hydroxyl.

* * * * *